US008678290B2

(12) United States Patent
Adams et al.

(10) Patent No.: US 8,678,290 B2
(45) Date of Patent: Mar. 25, 2014

(54) STEGANOGRAPHY WITH PHOTO-RESPONSIVE DYES

(75) Inventors: Christian Adams, Yalaha, FL (US); Richard Allen Vaughn, Arlington, TX (US); Joe M. Wright, Southlake, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 687 days.

(21) Appl. No.: 12/714,055

(22) Filed: Feb. 26, 2010

(65) Prior Publication Data
US 2011/0210173 A1  Sep. 1, 2011

(51) Int. Cl.
G06K 19/06 (2006.01)
G06K 19/00 (2006.01)

(52) U.S. Cl.
USPC .......................... 235/491; 235/487; 235/494

(58) Field of Classification Search
USPC ...................... 235/439, 454, 487, 491, 494
See application file for complete search history.

(56) References Cited

U.S. PATENT DOCUMENTS

| 4,982,073 | A | 1/1991 | Stenzel |
| 7,537,170 | B2* | 5/2009 | Reed et al. ............... 235/494 |
| 7,926,730 | B2* | 4/2011 | Auslander et al. ........ 235/494 |
| 2002/0090112 | A1* | 7/2002 | Reed et al. ............... 382/100 |
| 2003/0006170 | A1 | 1/2003 | Lawandy |
| 2004/0038390 | A1 | 2/2004 | Boege et al. |
| 2004/0150217 | A1 | 8/2004 | Heffelfinger et al. |
| 2005/0067489 | A1 | 3/2005 | Jones et al. |
| 2005/0236481 | A1 | 10/2005 | Gascoyne et al. |
| 2006/0041898 | A1 | 2/2006 | Potrailo et al. |
| 2006/0118738 | A1 | 6/2006 | Ross et al. |
| 2007/0138285 | A1 | 6/2007 | Auslander et al. |
| 2007/0246543 | A1* | 10/2007 | Jones et al. ............... 235/491 |
| 2009/0194589 | A1 | 8/2009 | Moon et al. |
| 2010/0140501 | A1* | 6/2010 | Lawandy ................. 250/459.1 |
| 2011/0180603 | A1* | 7/2011 | Jones et al. ............ 235/462.42 |

FOREIGN PATENT DOCUMENTS

WO WO 2008/008771 A2 1/2008

* cited by examiner

*Primary Examiner* — Thien M Le
*Assistant Examiner* — April Taylor
(74) *Attorney, Agent, or Firm* — Birch, Stewart, Kolasch & Birch, LLP

(57) ABSTRACT

An article identifier or code including at least one photo-responsive dye and a method of encoding or embedding information in same. A reader device for decoding or extracting information in an article identifier or code and verifying or authenticating that information and the associated extraction and authentication methods.

34 Claims, 9 Drawing Sheets

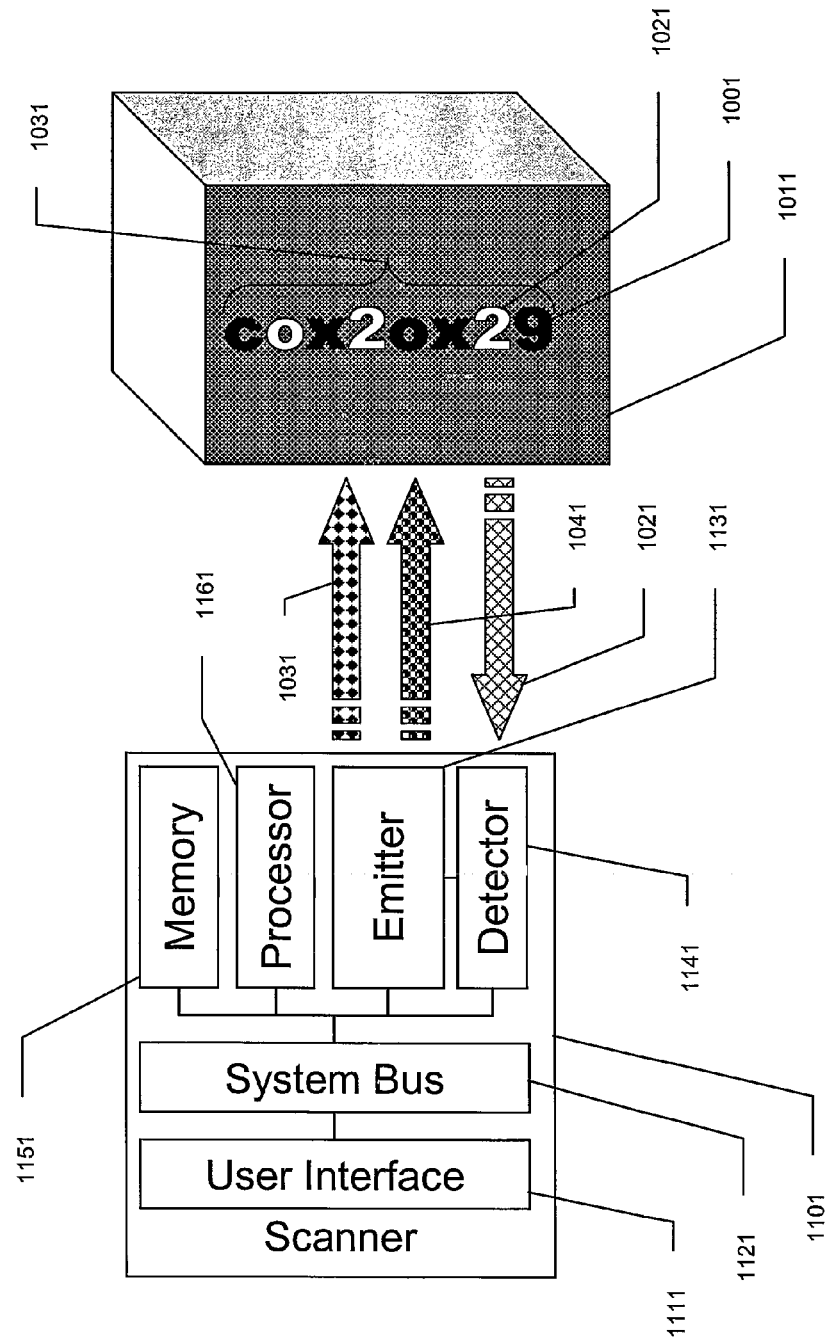

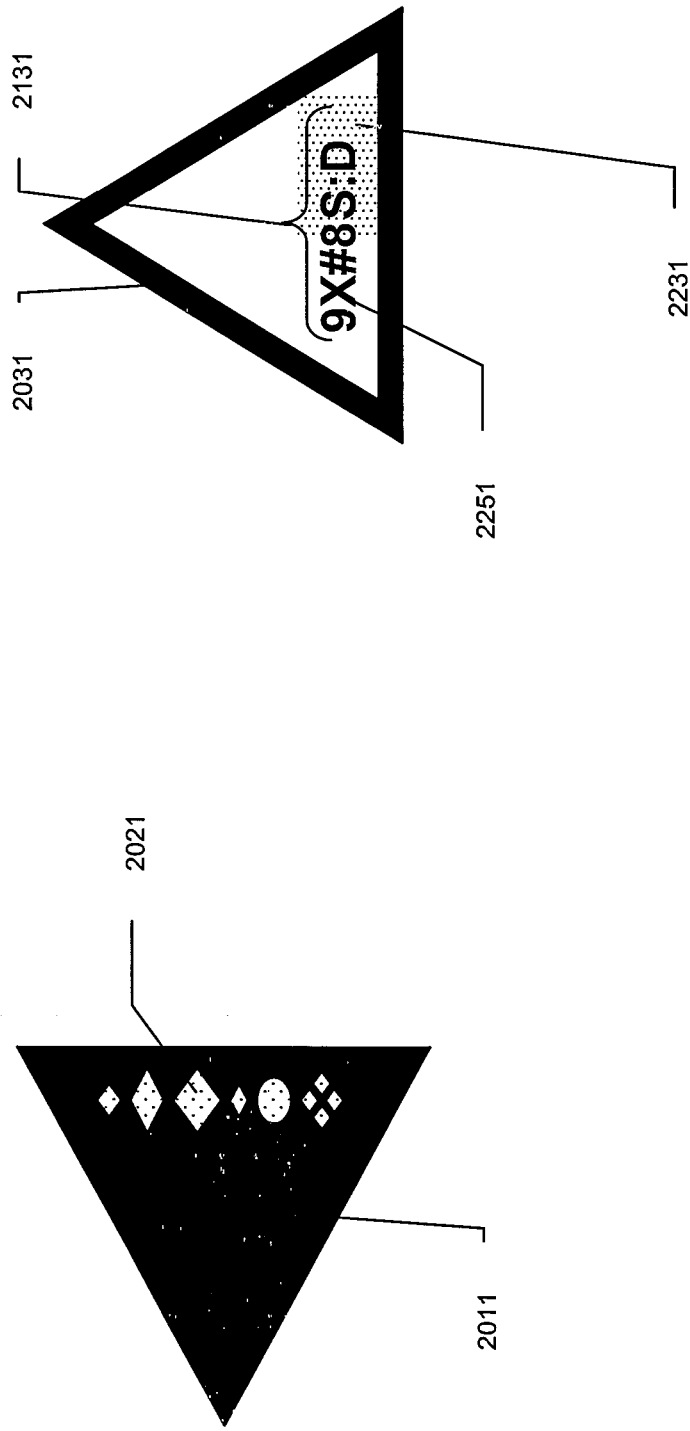

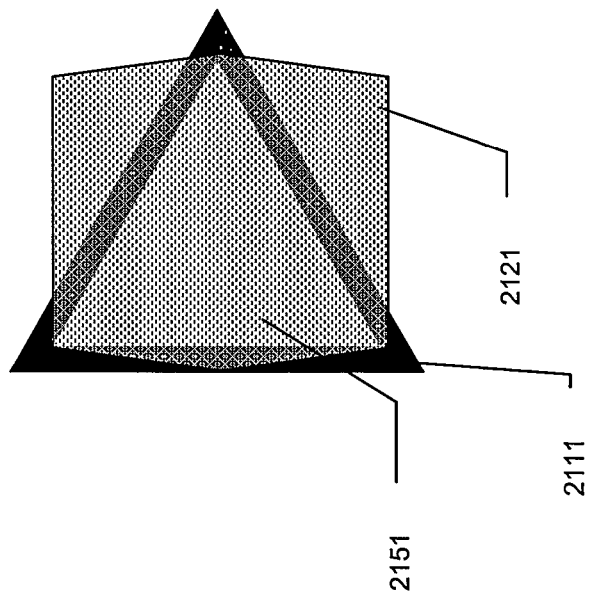
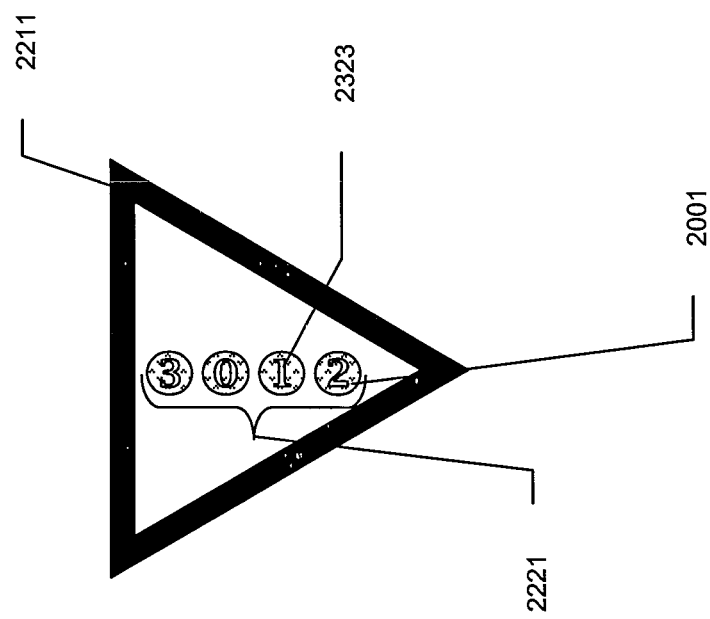

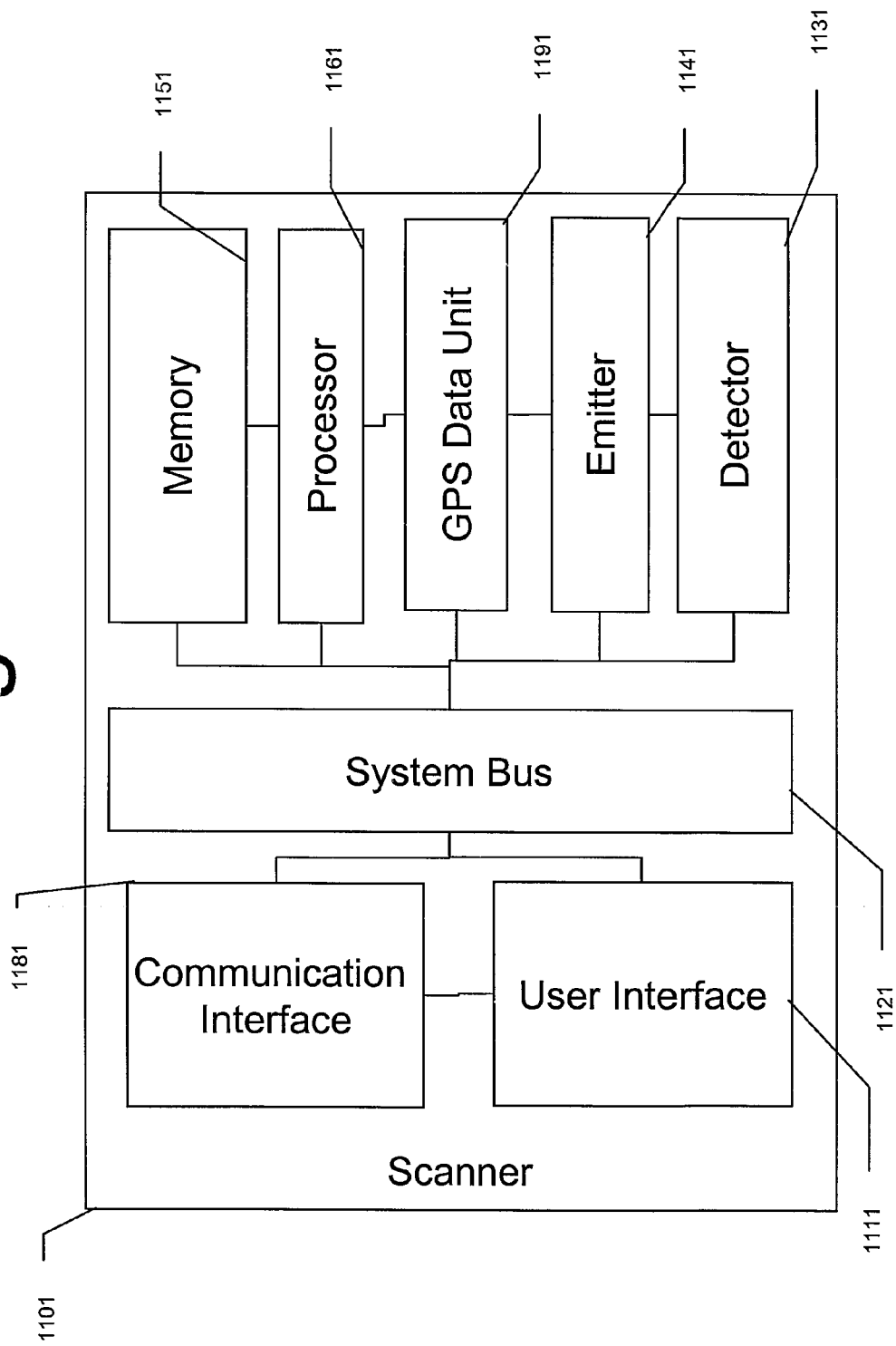

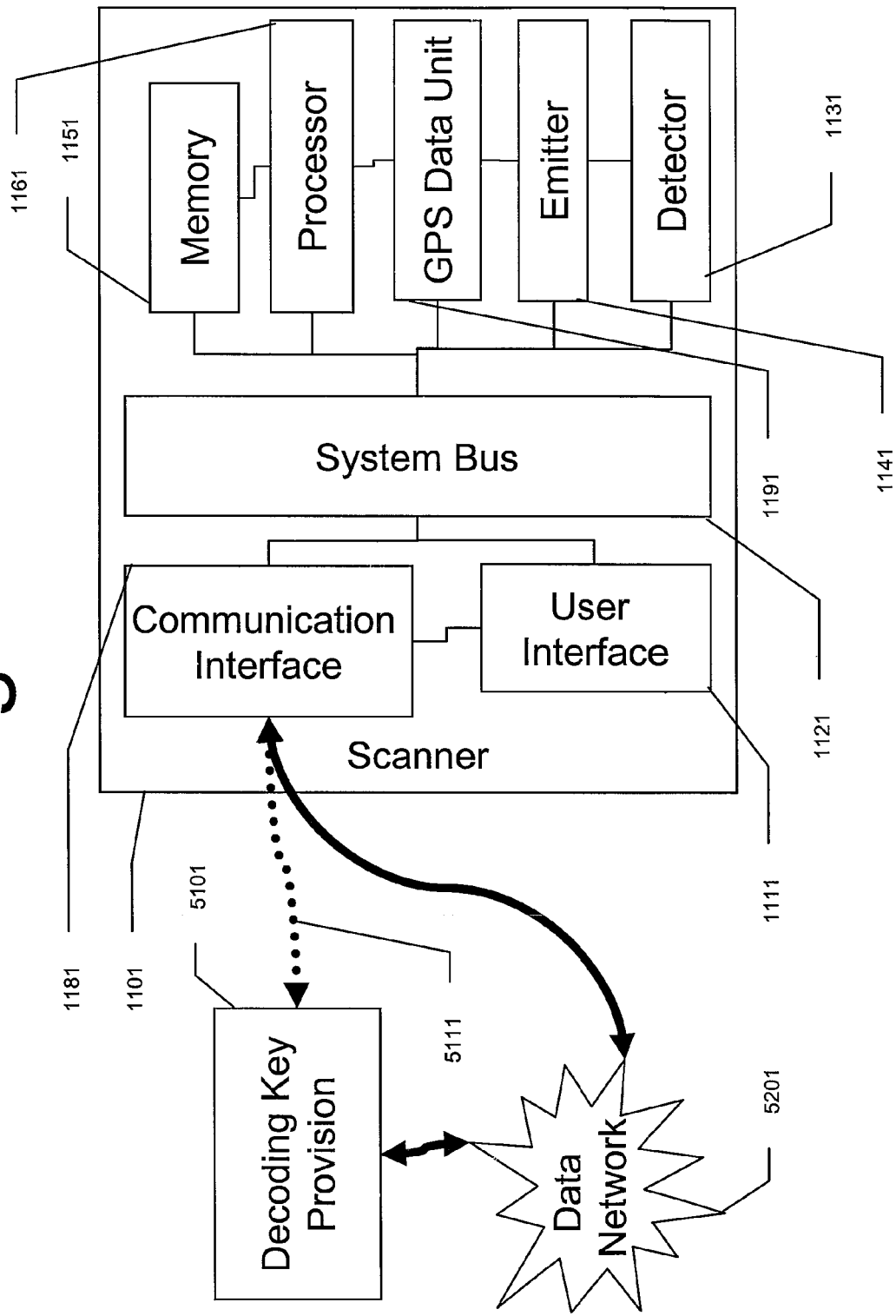

STEGANOGRAPHY WITH PHOTO-RESPONSIVE DYES

BACKGROUND OF THE INVENTION

In the field of inks and dyes, there are several applications for fluorescent inks and dyes and combinations of florescent inks and dyes having disparate or complementary frequency responses. Various security and anti-tamper and authentication solutions making use of fluorescent or otherwise photo-responsive inks are currently known, but they have deficiencies that enable them to be readily counterfeited or otherwise circumvented. Fluorescent or similarly photo-responsive dyes are typically used so that the photo responses of the dyes do not overlap or are otherwise readily visibly distinguishable during simultaneous or single-source illumination. It would be a significant advantage, however, to leverage multiple photo-responsive materials to create a visible code that used sequential or modulated illumination, multiple illumination sources, and/or forms of spectral filtering to add further layers of security and authentication to the code.

INVENTION SUMMARY

Aspects of the present invention are directed to photo-responsive, dye-based article identifiers that identify some characteristic or trait of an article, methods of producing those identifiers, readers to read the information stored in such identifiers, and methods of reading and verifying the information stored in such identifiers.

Embodiments of article identifiers may include dye-based identifiers that include two or more fluorescent dyes having overlapping response frequency bands or a common response or excitation frequency band. In some embodiments, the response and/or excitation frequency bands of dyes in a multiple-dye identifier may be the same. In other embodiments, the response and/or excitation frequency band of one dye may be contained within the response frequency band of a second dye. In yet further embodiments, spectrally similar dyes (ones whose response frequency bands are not readily distinguishable) may include other differing characteristics such as different fluorescence response delays, differing excitation frequency bands, or different post-fluorescence relaxation times.

In some embodiments, part of the information contained in the identifier may be defined or accessed by manipulating or otherwise knowing the difference between the frequency bands of the response or excitation frequency bands of two or more dyes. Such embodiments may include variations where a dye with a narrow-spectrum response frequency band is combined or otherwise utilized along with a dye with a broad-spectrum response that includes the narrow-spectrum response band. Alternate embodiments may include variations where a dye with a narrow-spectrum excitation frequency band is combined or otherwise utilized along with a dye with a broad-spectrum excitation band that includes the narrow-spectrum excitation band.

Further embodiments may take advantage of relaxation/response time profiles of dyes through the use of modulated illumination or sequential illumination for excitation. In such embodiments, two dyes having similar or, in some cases, identical excitation or response bands may have different relaxation/recovery times associated with an excitation/response cycle. Modulated illumination and detection may allow a reader device to distinguish one dye from another based on response times. In alternate embodiments, sequential illumination may allow for differentiation between narrow-band and wide-band excitation or response bands and/or may allow for differentiation between dyes having the same response or excitation bands or that are physically overlapping in an image or code.

Embodiments of the invention may also include a reader device configured to read and authenticate or verify a printed code containing at least one photo-responsive dye. Embodiments of such reader devices may include one or more electro-optical (EO) radiation emitters that emit radiation associated with excitation frequency band(s) of the fluorescent or otherwise photo-responsive dye(s). Embodiments of emitters may emit visible-spectrum EO radiation or may emit infrared, ultra-violet, millimeter-wave or some combination thereof. Embodiments of emitters may emit modulated illumination pulses or may have a specific emission sequence.

Embodiments of a reader device may also include a detector that detects the response of one or more fluorescent dyes. Detector embodiments may also include imaging detectors or detector components that image the printed code in a non-illuminated and/or partially illuminated state that may be associated with sequential or modulated emitter operation or otherwise based on the excitation/response times associated with one or more of the dyes in the code.

Embodiments of a reader device may have one or more processors and memory storage areas for control of the emitter(s) and detector(s) as well as processing storage of detection results. Embodiments of processors and memory may include custom-built digital data processing and storage components or commercially available components. Embodiments, of processors and data storage media may be magnetic, optical, electronic, or some combination thereof.

Embodiments of a reader device may also include an interface and/or data connection/output points that allow a user or downstream system to interact with the reader device. Embodiments may include keypad or touch-screen interfaces, displays, infra-red ports, Ethernet ports, sockets for removable storage media, and/or custom-designed interfaces and/or data access points. Further embodiments of a reader device may include a system bus or other interconnection system or device allowing the various components of the reader to communicate through one or more common data channels.

Embodiments of the invention may also pertain to methods of encoding or storing information in article identifiers of the type discussed above, and of recovering or authenticating the data stored, encoded, or embedded in such an embodiment of an article identifier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein FIG. 1a depicts an embodiment of a reader device according to the present invention reading an article identifier according to the present invention;

FIG. 2b depicts an embodiment of a partially alphanumeric article identifier according to the present invention;

FIG. 2c depicts an embodiment of an article identifier according to the present invention;

FIG. 2d depicts an embodiment of an article identifier according to the present invention;

FIG. 2e depicts an embodiment of an article identifier according to the present invention;

FIG. 4 depicts an embodiment of a reader device according to the present invention; and FIG. 5 depicts an embodiment of a reader device and an associated data system according to the present invention.

Figure 1B:
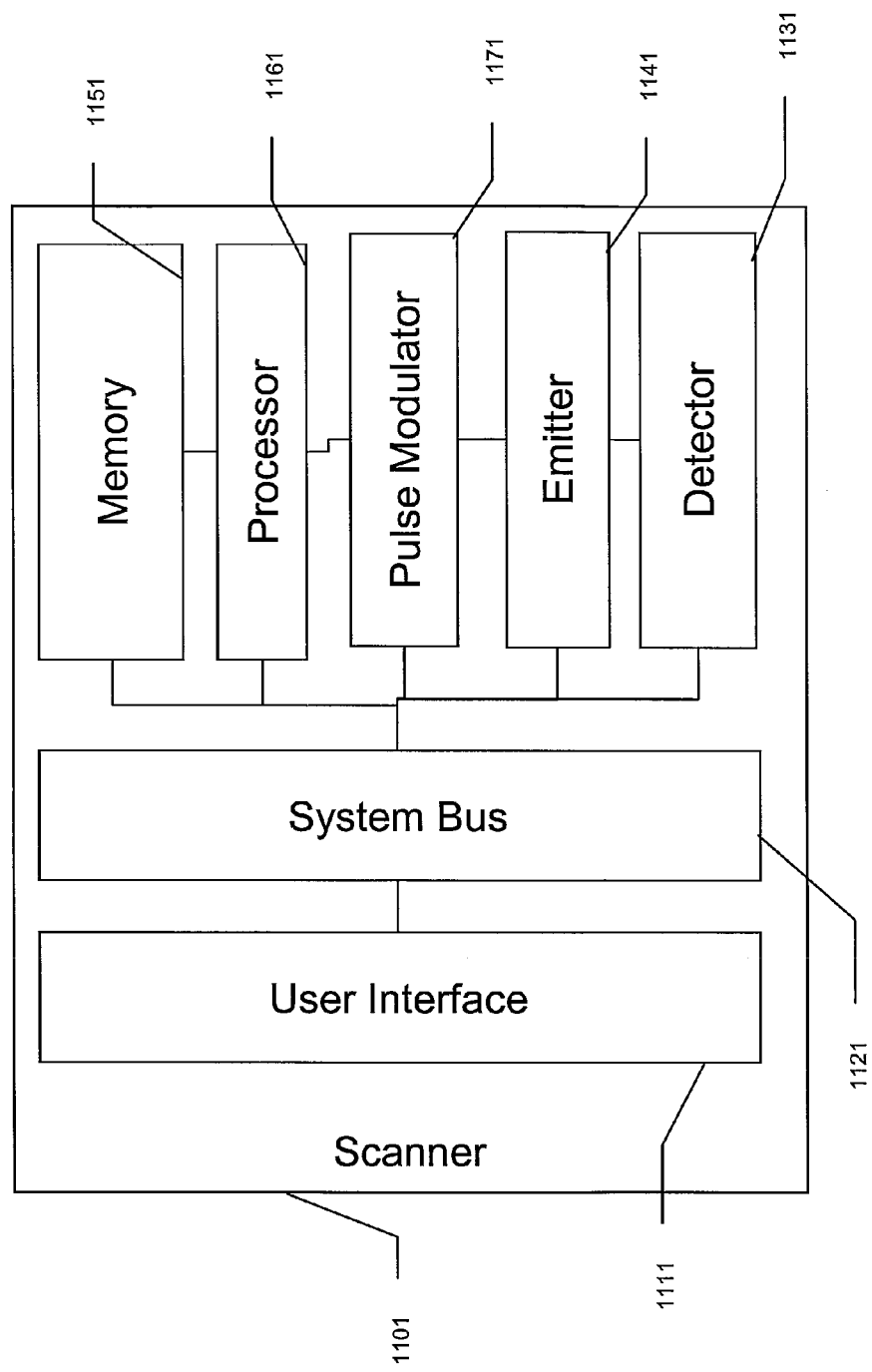
FIG. 1b depicts an embodiment of a reader device according to the present invention.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Dyes such as anti-stokes fluorescent dyes, or similar dyes that may be used to produce inks or pigments that are visible but also responsive to photo-excitation as specific (visible or non-visible) frequencies may be used to generate visible codes that have a secondary, frequency-specific component which may or may not be visible.

In one embodiment, two photo-responsive dyes having the same emission frequency but disparate excitation frequencies may be applied to create a visible alpha-numeric, bar-code, two-dimensional image-based code, or three-dimensional and/or holographic image-based code. Part of the code printed in the first dye may require a particular excitation frequency, such as infra-red, ultra violet, or a particular visible-spectrum frequency, and may generate an electro-optically readable response in a particular frequency band. The part of the code printed in the second dye may operate in a similar fashion but with a different excitation frequency to elicit the response. In some embodiments, the printed code may also have portions that are readily visible to the naked eye. In other embodiments, the printed code may be partially or completely invisible to the naked eye or otherwise not fully discernible through visible-spectrum illumination. Yet further embodiments may employ a single dye coupled with a visible image or with a textured structure such as Braille type, embossed or raised lettering or images, or with a three-dimensional structure such as a crystal or laminated substance having one or more photo-responsive materials embedded or included therein. Further embodiments still may employ a photo-responsive dye as a code-bearing dye and another, different photo-responsive dye as a background or a masking/concealing dye. In some embodiments, the masking dye may have a response frequency band that includes the response frequency band of the code-bearing dye. In other embodiments, the masking dye may have an excitation frequency band that includes the excitation frequency band of the code-bearing dye.

To read embodiments of such codes, a specialized device may be required to illuminate the code with the required frequencies (either simultaneously, sequentially, or at a specific time frequency, depending on the particular fluorescent and/or phosphorescent excitation and relaxation properties; the physical properties of any associated materials or textured surfaces; and material-specific properties of the fluorophore in question) and read the photo-responsive code portions (as well as the visible portions in cases where some or all of the code is printed, rendered, or responsive in the visible spectrum). The code reader may the use the code for a variety of authentication or verification routines.

An embodiment of a code reader device is depicted in FIG. 1a. The embodiment shown in configured for a code embodiment using two photo-responsive dyes with different excitation frequency bands and the same response frequency band. In such an embodiment, a reader device, such as a scanner 1101, may include a user interface 1111, a memory portion 1151, a processor 1161, an emitter 1131 that emits electro-optical radiation having a first frequency 1041 and a second frequency 1031 corresponding to the excitation frequencies of the dyes, and a detector 1141 that reads the photo-activated response from illuminated dyes 1001, 1021 contained in a code or article identifier 1031 located on an article or article package 1011. The reader device 1101 portions may all be connected/interfaced with each-other through a system bus 1121 or similar information conduit.

Embodiments of the emitter portion 1131 of the reader device may have one or more electro-optical emitters that emit electro-optical radiation 1031, 1041 such as infra-red or ultra-violet lamps or LEDs, lasers, specific visible-spectrum light sources, or any other number of electro-optical radiation sources suitable for triggering a photo-response from one or more photo-responsive inks or dyes. Alternate embodiments may include multiple emitters or may include configurable or switchable emitters that may have a range of emitted radiation frequencies or wavelengths to choose from or cycle through on a configurable or pre-determined sequence. Further embodiments may include emitters or emitter components that generate visible-spectrum radiation in particular wavelength ranges associated with specific dye colors. Yet further emitter embodiments may include range-finding signal emission capabilities for reading raised, embossed, textured, or three-dimensional code-bearing portions such as Braille, textured ink, raised or engraved lettering or images, and/or code portions embedded in transparent or translucent solids. Yet further emitter embodiments may include laser emitters specifically configured to trigger certain types or portions of holograms. Further embodiments still may include an emission sequencer or modulator that establishes an emission sequence to trigger one or more dyes in a particular order and/or to generate a particular response based on expected material-specific fluorescence response times. Such a sequencing or modulation component may be part of the emitter 1131 or may be included in an emitter control sequence performed by the processor 1161 and/or selectable through the user interface 1111.

The detector portion 1141 in the embodiment shown is configured to detect the particular electro-optical wavelength(s) 1021 associated with the response frequency of the dyes in the code or article identifier 1031 (such as, for instance, visible spectrum and near infra-red, a particular set of visible spectrum wavelengths, high-frequency visible spectrum and ultra-violet, or other combinations thereof). Embodiments may be configured to detect and identify or otherwise capture information associated with frequency modulations derived from material-specific fluorescence response times. Yet further embodiments may be configured to detect range-finding signals or otherwise work with an emitter in a range-finding capacity. Further embodiments still may include detectors that read relative temperature differences or spectral variations between visually indistinguishable dyes that are not spectrally identical. Embodiments of a detector may include spectrometry or spectrographic capabilities. Other embodiments may include one or more electro-optical detectors with one or more expected response or detection profiles stored in the memory 1151 or otherwise provided to the processor 1161 for comparison, validation, or other computation with respect to detection results.

Some detector embodiments may be configured for visible spectrum detection. In some embodiments, a visible spectrum detector may be sufficient for dyes or dye-combinations having visible spectrum fluorescence responses. In other embodiments, detectors may be configured to operate in visible and non-visible portions of the electro-optical spectrum, such as the infra-red, ultra-violet, or millimeter wave spectra. In such embodiments, in addition to reading the visible portion of a photo-responsive dye code written on a box or bag or other item, the detector can also be configured to detect the specific response wavelengths associated with photo-excitation of the photo-responsive dyes used in at least part of the printed code. Alternate embodiments may have multiple detectors or may include spectral filtering techniques or components (such as notch or band-pass filters). Detectors equipped with filters or other frequency band specific detection capabilities may be used to read embodiments of codes or article identifiers created with dyes that have overlapping response frequency bands, such as a first dye with a response between 550 and 600 THz and a second dye with a response between 570 and 580 THz.

Embodiments of detectors may include focal plane arrays, linear scanning arrays, photodiodes, charge-coupled devices, multi-color detector devices, or coupled monochrome detectors. Further embodiments may include selective filtering such that a monochrome detector may effect two-color operation by restricting certain pixels of the detector to only certain wavelengths or wavelength ranges. Yet further embodiments may include multiple emitter/detector combinations or variations such as a range-finding detector, a temperature-sensing detector, and a code-reading detector—all of which may be parts of a single detector device or element, or may be separate detector components associated with particular emitters. Further embodiments still may include single-emitter/single-detector embodiments configured to work with one particular photo-responsive dye or with multiple photo-responsive dyes having activation and response frequencies covered by the emitter and detector, respectively. Yet further embodiments may include detector modulation such that the detector is selectively or sequentially activated to produce a modulated detection signal from an un-modulated emitter signal or to work in concert with a particular emitter sequence or modulation. Such embodiments may be configured to create detection profiles, sequences, or intensity gradients that can only be accomplished by a combination of one or more particular photo-responsive dyes and particular emitter or detector modulation sequences.

The processor 1161 and memory 1151 embodiments shown in FIG. 1*a* may include any suitable data processing and storage technology, including digital signal processors, analog transistor cores, volatile data storage (such as RAM or PROM), optical data storage, magnetic data storage, and removable data storage portions. Processor 1161 embodiments may be configured to operate the emitter 1131 and detector 1141 based on program or operating parameters stored in memory 1151 or input via the interface 1111. In some embodiments, the processor can control emitter 1131 illumination sequence and/or pulse frequency according to parameters provided either through programming or user control and/or via material-specific calibration steps (such as particular pulse modulation frequencies associated with particular dyes or dye combinations based on desired response profiles or information coding techniques). Operation of the detector, such as integration or read-out times, detector modulation. The scan results acquired by the detector may also be stored in memory 1151 and/or displayed via the interface 1111 or passed to another system for further display or processing.

In some reader device embodiments, emitter and/or detector modulation may be accomplished with a pulse modulator device or unit 1171 as shown in FIG. 1*b*. Such a component may be integrated into an emitter or detector assembly or may be a standalone component containing one or more programmed and/or selectable modulation profiles or emission/detection sequences.

In the embodiment shown in FIG. 1*a*, the photo-responsive code 1031 is printed in two different dyes 1001, 1021 on a box 1011 that may be an inventory or storage item or a product for sale. In the embodiment shown, the two photo-responsive dyes have different excitation frequencies but the same response frequency. Embodiments of dyes may include ones that are responsive to ultra-violet, infra-red, laser, millimeter-wave, or polarized electro-optical radiation. Further embodiments may be responsive to specific wavelength and intensity combinations of electro-optical radiation and/or specific polarization types. Further embodiments may include anti-stokes fluorescent dyes, quantum-dot-bearing inks or other inks or dyes with photo-converting or photo-emissive properties.

Single response frequency band embodiments may be used with simultaneous, sequential, or modulated emission/detection approaches. In an embodiment using simultaneous emission, both excitation frequencies are simultaneously provided to the dye-bearing code and the response of both dyes is detected. Authentication or verification may then be accomplished by comparing the detected response against an expected response. In embodiments where the entire code is printed in photo-responsive dyes, the entire code may be evaluated. In embodiments where only part of the code is printed in photo-responsive dyes (the remainder of the code being printed in ordinary ink—the term "ordinary ink" means any non-fluorescent ink, including inks and dyes not readily visible to the naked eye or otherwise not readily discernible or distinguishable in the visible spectrum, such as infra-red or ultra-violet dyes, or laser-readable inks), the photo-responsive part of the code may be compared or otherwise processed in conjunction with those parts of the code that are not photo-responsive. This may be accomplished using a hashing function or some other verification method to ensure that the photo-responsive and non-photo-responsive code portions are correctly associated or otherwise indicative of a valid code or article identifier.

Figure 2A:
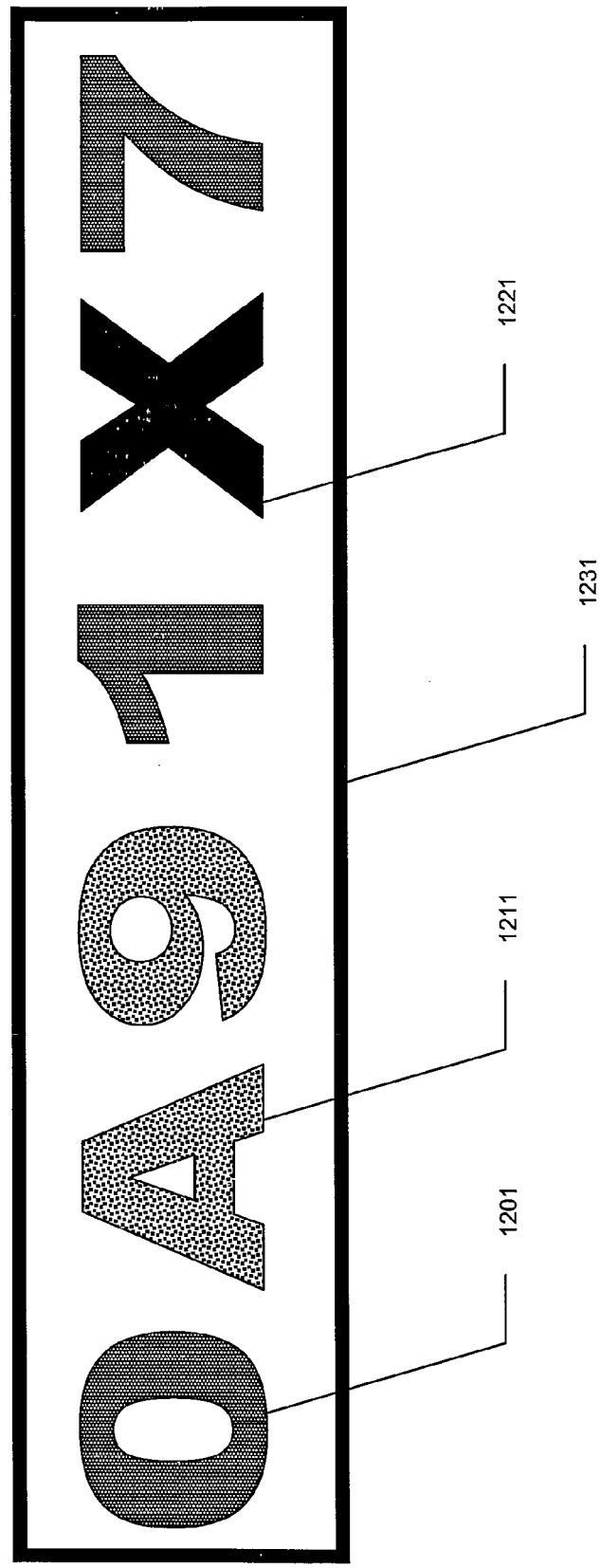
FIG. 2a depicts an embodiment of an alphanumeric article identifier according to the present invention.

An embodiment of such an article identifier is shown in FIG. 2*a*. The embodiment depicted uses an alpha-numeric code 1231 printed in two photo-responsive dyes 1201, 1211—some numbers printed in the first dye and some in the second—and an ordinary ink 1221. Although the depicted embodiment shows one of the photo-responsive code portions as a hexadecimal number, any numeric or alpha-numeric counting system may be employed (including ones employing reader-based ascii conversion or similar methods of deriving numerical values from representational characters or images) In the embodiment shown, the printed code is at least partially visible to the naked eye so that a person using a code-reader device will know where to point the device. In a simultaneous illumination embodiment, an emitter may trigger response from the first and second dyes 1201, 1211 and simultaneously read the responses of both dyes as well as any non-photo-responsive code components.

In a sequential illumination embodiment, one of the dyes 1201 may be triggered for response before the other dye 1211. The detection results of both responses may then be compared and evaluated to determine validity based on response spectral content, intensity, and time as well as the data content of the response. Alternate embodiments may also compare the illuminated detection(s) to an either previously or subsequently read image of the un-illuminated code. Other embodiments may employ photo-responsive dyes having different emission frequencies but the same excitation frequency. Such approaches may allow for the creation of visually monochromatic codes that are in producing code portions in different wavelengths. In yet other embodiments, a single photo-responsive dye may be used either alone or along with ordinary inks.

In a modulated illumination embodiment, an emitter may provide a particular sequence of illumination pulses to trigger the dyes in a predetermined response sequence, such as an alternating response sequence or one meant to provoke varying response times. Alternate embodiments may also include simultaneous illumination with delayed response. Such embodiments may use dyes having delayed fluorescence response in combination with dyes having either no delay or different delay. Embodiments of dyes may include substances such as doped anthracene, europium tetracycline complex, C70 (fullerene), and other substances having delayed fluorescence response. In some embodiments such substances may be included in dyes having the same excitation and response frequency bands, but different fluorescence delays. Simultaneous illumination of an article identifier containing such dyes may allow for sequential detection and validation of an identifier based on both data content and delay between fluorescence responses of identifier components. Such delayed response embodiments may also be combined with sequential or modulated illumination approaches. Such embodiments may include dyes having particular relaxation or recovery times between fluorescence responses such that illumination at a particular modulation may trigger fluorescence response at a different rate (i.e. response to only every other or every third pulse due to relaxation or recovery time of a dye between fluorescence response cycles).

Embodiments using dyes with differing excitation frequencies, fluorescence response times, and/or relaxation cycles in combination with sequential, simultaneous, or modulation illumination and/or detection may be useful for an article identification or code authentication system where a code or identifier is based on or contains information related to a function that accepts, as inputs, the portions written in the photo-responsive dyes, time-difference data, and/or rate of response vs. rate of illumination data. Such information may be compared or otherwise evaluated or subjected to mathematical operations such as hash functions that may or may not include information contained in any plainly visible portions of an embodiment of a code or identifier. Such a "hide-in-plain-sight" solution may allow for authentication of goods, vehicles, livestock, buildings, fortifications, or individuals without alerting potential counterfeiters or intruders or thieves that an authentication system is in place beyond the visible serial number.

Further embodiments of such a code may include "spoofing features" that may appear to be part of the code but are there to mislead code-breaking or code-counterfeiting attempts. Such embodiments may include extraneous characters or image portions written in ordinary or photo-responsive dyes that are either outside the detection spectrum of a reader device or are otherwise selectively ignored during a code-reading operation. Such embodiments may also leverage delayed fluorescence aspects of some photo-responsive dyes. A photo-responsive dye with an immediate fluorescence response 1201 may be combined with a photo responsive dye having delayed response 1211. In an embodiment where both dyes have the same excitation and response frequency, detection may be delayed a specified amount of time such that only the delayed-response dye is read or may be stopped after a specified amount of time such that only the immediate response dye is read, with the other dye creating bogus data meant to confuse would-be counterfeiters or thieves.

A further embodiment of a spoofing code approach is depicted in FIG. 2b. In the embodiment shown, visible portions of a code or image 2021 may be embedded within a larger image 2011, with the larger image 2011 and the code-bearing or article identifier portion 2021 both having the same visual appearance (in both color and texture). The larger image may be created using a dye having a broad-spectrum response while the code-bearing portion is created using a dye having a narrow-spectrum response contained in the broad-spectrum response dye. An example may include a broad-spectrum dye with a response waveband of 660 to 690 nm and a narrow-spectrum dye with a response waveband of 680 to 670 nm. A detector equipped with a notch filter would register a negative image of the code 2021 whereas an observer would, without the aid of specialized equipment, be unable to discern the presence of an embedded code in the image even with an awareness of its photo-responsive properties.

In an alternate embodiment, a code dye 2010 having a delayed response may be utilized in conjunction with a spectrally identical dye having either no delay or a different delay. A modulated illumination approach may be used to activate and then 'drown out' the code repeatedly. In such an embodiment a detector may eventually develop an image of the code whereas the activation and drown-out time may be too rapid for a human observer to discern.

In further embodiments, the code symbols 2021 and the "substrate" image 2011 can be printed in two different photo-responsive dyes that either have different trigger wavelengths or different photo-response wavelengths. A code reader of the type in FIGS. 1a or 1b may be used to read both the immediately visible and photo-responsive portions of the code. Depending on how the reader is configured, the reading may be simultaneous, sequential, or some combination thereof (such as first reading the visible and then reading both photo-responsive portions, or vice-versa).

Further embodiments of spoofing solutions may include an image, letter, or number printed partially in a photo-responsive dye and partially in a visually identical non-photo-responsive dye. In the embodiment shown in FIG. 2c, an alphanumeric sequence 2131 may be embedded within an image 2031 or printed on a container or surface. A portion of this sequence 2251 may be printed in an ordinary ink and a portion may be printed in a photo-responsive dye 2231. In the embodiment depicted, half of the number "8" is printed in ordinary ink whereas the other half is printed in an ink carrying a photo-responsive dye. Although printed as "8S:D," the photo-responsive portion of the code is actually "3S:D" (3 being half of 8 from a visual standpoint). Other examples can include embedding the letter i or 1 into a capital H or the number 4, or embedding an asterisk shape into a radiation symbol.

Alternate embodiments may combine different photo-responsive dyes having specific fluorescence/phosphorescence relaxation times, response delays, or response waveband overlaps. In delayed response or relaxation time embodiments, an illumination pulse sequence with a specific pulse sequence, modulation profile, or modulation frequency (or frequencies) can be used to excite such materials into producing the desired response. Relaxation phenomenon associated with such fluorescent/phosphorescent materials may include or otherwise allow for time delays that, when expected, can be leveraged to provide additional label-specific information and/or data. In some embodiments, expected time delay between excitation/relaxation cycles in a material may be leveraged against a pulse modulation sequence offset from the response profile of the material such that the temporal characteristics of the material response serve to authenticate a code or provide some or all of a decoding key for information stored in or associated with the code. In embodiments having spectral overlap, notch or band-pass filtering may be used to separate the 'bogus' photo-response from the desired photo-response. In either embodiment, the desired code or article identifier components may be embedded within valid-looking but partially bogus codes, making the code more difficult to identify and extract.

Further variations of such an embodiment may include writing the code in dyes that respond to photo-excitation in two visually indistinguishable shades of orange (or green, or mauve, or black, or any other suitable color or color combination) and having a scanner specifically calibrated to distinguish between the two shades (460 nm vs. 480 nm, for example). Further variations may include using day-glow inks (inks whose excitation frequencies are in the visible spectrum) to make the fluorescence response of the photo-responsive dyes more difficult to detect with the naked eye.

In yet another embodiment, shown in FIG. 2d, a numeric or image sequence (or a combination thereof) 2221 can be embedded in an image 2211 or a pictographic sequence may be embedded in an alphanumeric character or code, or some variation thereof. The photo-responsive properties of the embedded code(s) 2001, 2323 may be configured such that some or all of the code has a broad-spectrum photo-response whereas other portions may have narrow-spectrum response or otherwise be visually indistinguishable during broad-spectrum illumination. Part of all of the embedded code 2221 may have the visual-spectrum color of its associated shape such that visual examination will not show the embedded code. In such embodiments a modulated or otherwise predetermined illumination sequence may be required to generate broad-spectrum response followed by narrow spectrum response or narrow-spectrum color detection and processing. Purely broad-spectrum illumination, even with the required broad-spectrum frequency band necessary to activate part of the code 2001, may drown-out or otherwise fail to trigger the other portions 2323, providing a further level of data security to delay and complicate unauthorized access or duplication attempts.

Alternate embodiments may employ visibly distinct embedded codes or partially visible embedded codes such that a user or machine operating a reader will have a reference point for reading the codes. In the embodiment shown 2221, the numeric sequence 2323 may be created by using offsetting circles of photo-responsive dye 2001 to create negative images of the numbers 2323. In alternate embodiments, positive images can be painted or a combination of positive and negative images can be used. In yet further embodiments, the "substrate" image 2211 may also be printed in a photo-responsive dye. Embodiments of such a multi-dye solution may include a background image 2211 responsive at 640 nm, an intermediate image 2001 responsive at 650 nm and an internal image 2323 responsive at 660 nm, requiring sensitive spectral filtering to separate and analyze the code portions. Further embodiments may have a background image with no response delay or relaxation time, an intermediate image with sub-microsecond delay or relaxation time, and an internal image with multi-microsecond delay or relaxation time, requiring a specific emitter sequence or detection sequence to identify and analyze the code portions.

Further embodiments may employ one or more visually multi-chromic dyes having photo-responsive properties as discussed above. Such embodiments may have a multi-colored code (such as an image) that, when exposed to particular excitation frequencies, responds with a specific light wavelength. Such embodiments may include a sequence of images or image portions meant to be read or analyzed in a particular order. Exposure to a first excitation frequency causes a particular set of images or image portions to respond, which are then read and processed as a group. These may be added, subtracted, or otherwise compared against the visible spectrum portion(s) of the image for decoding or authentication. Embodiments using multiple dyes or particular modulation sequences may call for further exposure to subsequent excitation frequencies or frequency modulations may cause subsequent sets of images or image portions to respond. These may also be read as a group or may be somehow visually added to or subtracted from the first image set or the visible image portions (or both) to generate a code or code portion.

One such embodiment is depicted in FIG. 2e. In the embodiment shown, two overlapping images may create three distinct response areas. A first image containing a first photo-responsive dye 2111 may be overlapped with a second image containing a second photo-responsive dye 2121. The overlapped area 2151 may, in an embodiment where the dyes share a common excitation frequency band, generate a combined or composite fluorescent response distinct from either the first or second dye. Such embodiments may be combined with image-based or alphanumeric article identifiers to provide additional verification or detection data for a code or article identifier.

Figure 2F:
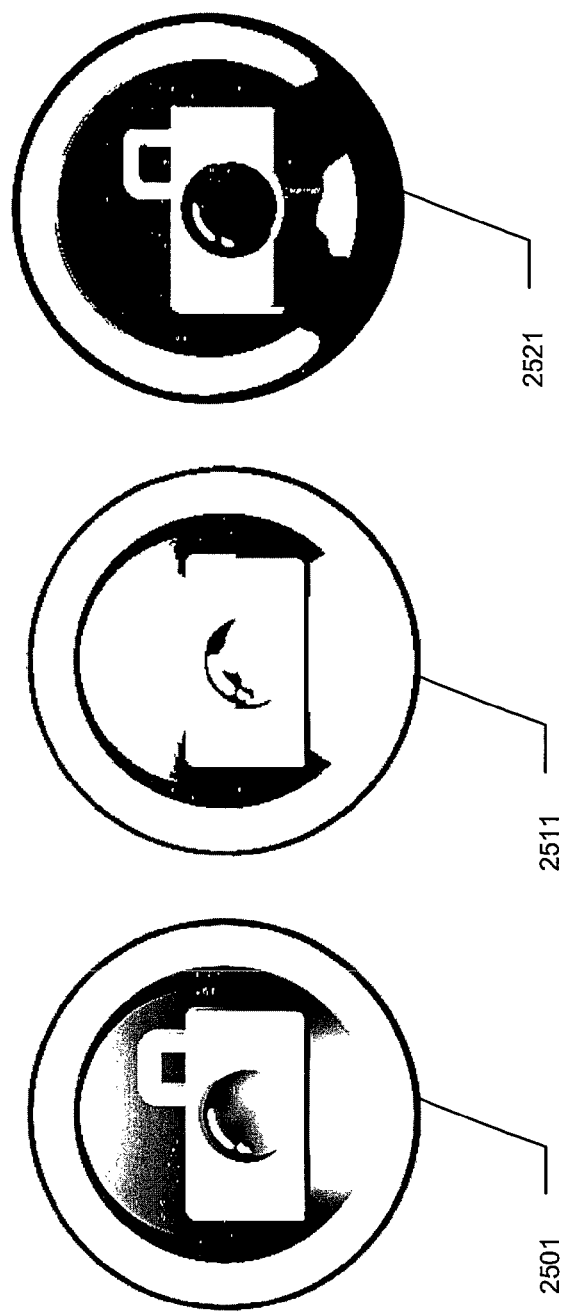
FIG. 2f depicts an embodiment of an image-based article identifier according to the present invention.

A further embodiment of an overlapped-image article identifier is depicted in FIG. 2f. In the embodiment depicted, an image of a camera 2051 may include, either as part of the dyes and inks included in the image or as invisible, photo-responsive dye components, image portions 2511, 2521 made of photo-responsive inks or dyes (such as fluorescent dyes). The image portion can overlap at least partially and can be scanned and read either sequentially or simultaneously. For embodiments using dyes that have different response frequencies and/or response delays, simultaneous illumination may result in combined or hybrid response from the overlapping portions. One dye may partially filter or augment the response of the other—much like mixing or layering paints would do for visible spectrum colors. Such attenuation, blending, or enhancement as a result of the overlap may also be used as a code-bearing component. In further embodiments, similar effects can be introduced by leveraging the temporal aspect of fluorescent/phosphorescent relaxation phenomenon, whereby incorrectly pulsed illumination will not resolve the proper code. In such embodiments, dyes having different response delays or relaxation times may be fully or partially overlapped such that the different code or information portions contained in the dyes may only be resolved using the proper illumination pulse modulation profile. In some embodiments, this may allow for spectral shift during or resulting from illumination (i.e. a code may fluoresce green and then shift to blue or yellow as certain portions begin responding later or cease fluorescing earlier). Further embodiments may include only one photo-responsive dye or may include many photo-responsive dyes. Such embodiments may also incorporate the spoofing solutions discussed above.

A further embodiment may include an encoding system for optically-readable media (including bar codes, punch cards, printed text, cds, dvds, etc.). In some cases, the information itself may be printed as a sequence of images that are at least partially written in two or more such photo-responsive dyes. A specialized scanner may read the printed images and their excitation response frequencies to determine a decoding sequence and process that may recover code data stored therein. This may be useful for printed message where some of the print is generated with a first dye having a first excitation frequency and some generated with a second dye having a second excitation frequency. The message itself may be encoded using a purely text-based encoding in addition to the dye-based approach.

An alternate example may include an optically-readable disc or similar media (etched glass, etc.) having what looks like "cover art" that is in fact an authentication code providing an access key that may be required to read or decode specific encoded portions of the data stored on the media.

Further embodiments may employ seemingly mono-chromatic dyes included as part of colored blocks on any suitable ink-bearing medium (paper, glass, metal, stone, fabric, skin, etc.). Such embodiments may have "hidden" visible codes composed of narrow-frequency dyes hidden in swaths of broader-spectrum paint. An example may include a limited edition lithograph where a section of the picture that is, say, a solid area of blue, has an authentication code printed in one or more visually indistinguishable blue inks that are composed of only one particular shade of blue or that respond to photo-excitation with a particular, narrow frequency. A scanner with a series of narrow-band optical filters would be required to distinguish the various shades of blue and read the authentication code.

Yet further embodiments may employ overlapping layers of photo-responsive dyes having different excitation frequencies but the same response frequency. Such an approach may be useful for embedding code fragments in visible media (such as a printed image or bar code or number) where the code generation process is sequence-driven. Exposing the printed image to the first excitation frequency and then adding or subtracting that response image from the one generated by the second excitation frequency in a particular sequence (such as doubling or fully removing the overlap portions, or considering only the fully overlapped portions) may add an additional level of protection to codes even in cases where potential counterfeiters or thieves or intruders may know the required excitation frequencies to trigger the photo-responsive code portions.

Figure 3:
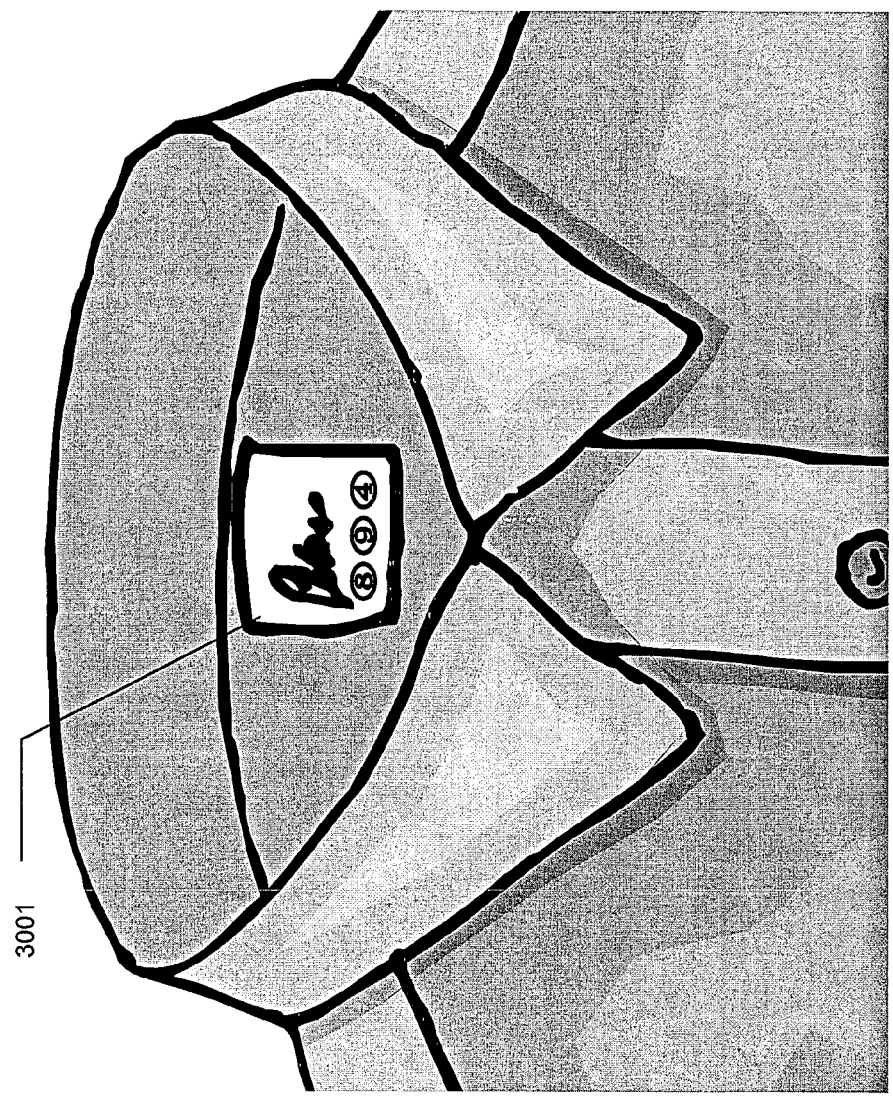
FIG. 3 depicts an embodiment of an article equipped with an article identifier according to the present invention.

Yet further variations may employ approaches where the photo-responsive dyes are colorless and mixed with conventional inks or dyes. Such approaches may allow code sequences to be painted into portions of visible serial numbers. Such approaches may also allow fabrics or materials to be dyed with photo-responsive dyes or ink formulations as described above. This may be especially useful for authenticating commonly-counterfeited merchandise such as clothing, shoes, and handbags. A manufacturer or designer tag may have an embroidered or dyed-in serial number or authentication code having multiple invisible, photo-responsive portions that have either different response or excitation frequencies as discussed previously. Such an embodiment is shown in FIG. 3. In the embodiment shown, a garment tag 3001 has a numeric code that may be printed, embroidered, or otherwise embedded in the tag. The code may include photo-responsive portions of an embroidered logo or may include portions of lettering or images printed on the tag. In further embodiments, the code may be embedded in the fabric of the tag itself and unrelated to anything embroidered or printed thereon. Tags according to such embodiments may be manufactured by clothing companies, designers, or security specialty operations. Such tags may be used to allow stores and consumers to verify the authenticity of a particular brand or item of clothing. For embroidered or printed embodiments, thread or ink having the proper photo-responsive dyes may be provided to clothing manufacturers for use or the tags may be separately produced.

Yet further embodiments may employ materials having inherent physical properties associated with or similar to the spectral and/or fluorescence properties of a dye such that a code may be generated based on the interaction between the intrinsic spectral properties of a material and those of a photo-responsive dye disposed or otherwise deposited thereon or therein.

Such codes may be used as inventory tracking codes associated with particular items or livestock or the like. In such cases, even a stolen or perfectly forged tag may be discovered because it is not associated with the particular thing that its code indicates it should be. In yet further embodiments, watches may also use such authenticating dyes as part of movements or watch faces so that counterfeits can be distinguished from genuine articles by a quick visual scan of the device.

Further embodiments still may combine coded tags or identifiers with a reader or scanner device which communicates with a central database. In such an embodiment a reader device may, upon scanning a particular code, associate that code with a scan location. An embodiment of such a reader is depicted in FIG. 4. In the embodiment shown, a reader 1101 is equipped with a GPS data unit 1191 and a communication interface 1181. The GPS data unit may be used for GPS position acquisition to establish time and location coordinates associated with a particular scanning operation. Alternate embodiments may replace or augment such a GPS data unit with a clock and a selectable or preset location setting. Such embodiments may be used in settings such as a warehouse or distribution center where the reader devices are meant to operate only within a particular warehouse or center or otherwise configured to acquire location data based on the warehouse or distribution center. One such embodiment may include a system where a reader synchronizes itself via a local network or bluetooth connection with an inventory database server located in or configured for access from the warehouse. Such synchronization may be accomplished through a communication interface 1181 that may be a radio-frequency transmitter, an optical data transfer unit, or a data jack configured for a hard-wired connection, or some combination thereof. In some embodiments, the communication interface may be part of the power or charging architecture for cordless, battery-powered readers. In other embodiments, the communication interface may be part of the user interface 1111 and/or the location data unit 1191 or otherwise integrated with one or both of those units.

In such a solution a scan would associate a time and location with a particular inventory item and provide such tracking or logistical data to retailers or consumers of the inventory item. A counterfeit or stolen item scanned at a subsequent location may then have its scan location and time compared with the last known scan location and time for the 'valid' tag. If an item reads as being in a physically impossible location (i.e. scan 1 on Monday in Bogota, scan 2 on Tuesday in Beijing) the item is flagged as possibly counterfeit or otherwise noted for further investigation. If an item previously marked as stolen or otherwise in an improper location is scanned (i.e. goods marked as destined for Dallas show up in Moscow), the scanning party may be alerted and further corrective action may be indicated.

Alternate embodiments may employ a hidden key solution. In such embodiments, a code or code portion disposed on an article and read with a reader must be compared or otherwise validated or examined in conjunction with key or code information stored elsewhere and unobtainable by only examining the code on the article. Such embodiments may include alphanumeric, image-based, or composite code sequences where a decoding or completing key or set of key data is stored in or otherwise provided to a reader device in conjunction with a code-reading operation.

In one embodiment, a reader device may contain an authentication code or image or data set such that the code read from the article may only be authenticated by a reader having the proper authentication information. An embodiment of this type may include a solution where a reader receives a "heartbeat" signal from an associated location, such as a warehouse, and that heartbeat signal contains the authentication information required to properly read article identifiers.

In one embodiment, shown in FIG. 5, the communication interface 1181 of a reader device may include a radio-frequency unit such as a Bluetooth device that associates the reader with a key or code or heartbeat signal generation server or system 5101 in a warehouse or other code-reading facility either through direct connection 5111 or via a data network 5201. The associated reader may then receive decoding information from the associated system 5101 and use that data to read and verify or decode an embodiment of a dye-based code. In some embodiments, particular facilities may have one or more particular decoding or verification codes or keys. Such facility and time-specific coding may be considered when generating or associating article identifiers such that a read article identifier may only be decoded or authenticated using decoding information associated with a particular time and/or place. Codes indicating merchandise intended for San Francisco, for instance, would not be properly read by a warehouse in Buenos Aires. In another example, article identifiers generated or created in April may only be read as valid during an expected shipping or transit period in May based on such time and location based decoding information.

In another embodiment, the communication interface 1181 may be a cellular communication device, an optical communication device, or some other information exchange unit that receives the additional decoding information or transmits scanned code information for decoding or verification at a remote location where the decoding information is stored. Further embodiments may include a system where a reader is synchronized with a decoding information server or system that routinely updates and propagates new decoding information and, in some variations, associated decoding validation/authentication criteria, such that a particular piece of decoding information is only usable during a particular time period.

Further embodiments may be configured using public/private key pairs such that a code or article identifier includes, in its detectable properties, a public key that can only be read or authenticated in combination with a private key accessed by, provided to, or otherwise stored in the reader device. Such a private key may be issued by a key-issuing system associated with the reader or may be provided to a reader user who must input or otherwise provide the key data to the reader during use via the user interface 1111. In yet further embodiments, a private key may be associated with an initiation or initialization operation associated with the reader. Such embodiments may require that a reader be provided with the private key as part of its activation or power-on process.

In yet further embodiments, a reader device may also generate decoding information for subsequent reading or scanning operations. In one such embodiment a detector 1131 may capture an image during a code-reading operation or may otherwise store a previously or subsequently captured image to be associated with a particular code reading operation. This captured image, or a data string based on the captured image, may then be transmitted, via the communication interface 1181 to the decoding data provision system for use or reference in a subsequent reading operation.

In yet further embodiments, a hidden-code style reader may have a non-associated operation mode where the code and component portions associated with the receipt, use, and/or generation of additional decoding data are de-activated and only a partial authentication or verification is performed during non-associated or otherwise non-decoding-data-based code reading. In some embodiments, attempts to activate or operate the decoding-data-based portions of such a reader while it is in a non-associated mode may trigger data or hardware anti-tamper measures such as information deletion, deliberate device overheating, or intentional overload of particular components.

Further variations of such approaches may also be used in combination with any of the above-described code printing and analysis techniques, or with any variations thereon. The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. An article identifier identifying at least a characteristic of an article, the identifier comprising:
   a first identifier component including a first fluorescent dye having a first excitation frequency band and a first response frequency band;
   a second identifier component including a second fluorescent dye having a second excitation frequency band and a second response frequency band;
   where the response frequency band of the second dye includes the response frequency band of the first dye; and
   where a property of excitation or response of the first component is different from a corresponding property of the second component and at least part of the identified characteristic is represented by this difference between the properties of the components; and
   where the first dye has a fluorescence response delay of one micro-second or greater.

2. The article identifier of claim 1, where the first and second dye have substantially identical spectral characteristics when not fluorescing.

3. An article identifier identifying at least a characteristic of an article, the identifier comprising:

a first identifier component including a first fluorescent dye having a first excitation frequency band and a first response frequency band;

a second identifier component including a second fluorescent dye having a second excitation frequency band and a second response frequency band;

where the response frequency band of the second dye includes the response frequency band of the first dye; and where a property of excitation or response of the first component is different from a corresponding property of the second component and at least part of the identified characteristic is represented by this difference between the properties of the components; and where the first dye has a post-fluorescence relaxation time greater than that of the second dye.

4. An article identifier identifying at least a characteristic of an article, the identifier comprising:

a first identifier component including a first fluorescent dye having a first excitation frequency band and a first response frequency band;

a second identifier component including a second fluorescent dye having a second excitation frequency band and a second response frequency band;

where the response frequency band of the second dye includes the response frequency band of the first dye; and where a property of excitation or response of the first component is different from a corresponding property of the second component and at least part of the identified characteristic is represented by this difference between the properties of the components; and where the first dye has a fluorescence response delay greater than that of the second dye.

5. An article identifier identifying at least a characteristic of an article, the identifier comprising:

a first identifier component including a first fluorescent dye having a first excitation frequency band and a first response frequency band;

a second identifier component including a second fluorescent dye having a second excitation frequency band and a second response frequency band;

where the response frequency band of the second dye includes the response frequency band of the first dye; and where a property of excitation or response of the first component is different from a corresponding property of the second component and at least part of the identified characteristic is represented by this difference between the properties of the components; and where the first and second identifier components include mathematically related information-bearing portions.

6. The article identifier of claim 5, where the first identifier component is an image or alpha-numeric string embedded within the second identifier component.

7. The article identifier of claim 5, where the response frequency band of the first dye is the same as the response frequency band of the second dye.

8. The article identifier of claim 5, where the information-bearing portion of the identifier is at least partially alpha-numeric.

9. The article identifier of claim 5, where the first and second dye have the same excitation frequency band.

10. The article identifier of claim 5, where the first and second identifiers are part of information printed or embroidered on a garment tag.

11. The article identifier of claim 5, the identifier further comprising a third identifier component including a third fluorescent dye having a third excitation frequency band and a third response frequency band.

12. The article identifier of claim 5, where the information bearing portion is at least partially represented by an ordinary ink.

13. The article identifier of claim 5, where at least one excitation frequency band includes infra-red wavelengths.

14. The article identifier of claim 5, where the second response frequency band includes infra-red wavelengths.

15. The article identifier of claim 5, the identifier further including a third identifier component created by combining or overlapping the first and second components.

16. The article identifier of claim 5, where the identifier is a multi-layered image and where at least one image layer includes the first identifier component and at least one other image layer includes the second identifier component.

17. An article identifier identifying at least a characteristic of an article, the identifier comprising:

a first identifier component including a first fluorescent dye having a first excitation frequency band and a first response frequency band;

a second identifier component having a second excitation frequency band and a second response frequency band;

where at least the first and second response frequency bands or the first and second excitation frequency bands are substantially the same; and where a property of excitation or response of the first component is different from a corresponding property of the second component and at least part of the identified characteristic is represented by this difference between the properties of the components; and where the first dye has a fluorescence response delay of one micro-second or greater.

18. The article identifier of claim 17, where the first and second identifier components have substantially identical spectral characteristics when not fluorescing.

19. An article identifier identifying at least a characteristic of an article, the identifier comprising:

a first identifier component including a first fluorescent dye having a first excitation frequency band and a first response frequency band;

a second identifier component having a second excitation frequency band and a second response frequency band;

where at least the first and second response frequency bands or the first and second excitation frequency bands are substantially the same; and where a property of excitation or response of the first component is different from a corresponding property of the second component and at least part of the identified characteristic is represented by this difference between the properties of the components;

where the second identifier component includes a second dye having the same excitation frequency band as the first dye; and where the first dye has a post-fluorescence relaxation time greater than that of the second dye.

20. An article identifier identifying at least a characteristic of an article, the identifier comprising:

a first identifier component including a first fluorescent dye having a first excitation frequency band and a first response frequency band;

a second identifier component having a second excitation frequency band and a second response frequency band;

where at least the first and second response frequency bands or the first and second excitation frequency bands are substantially the same; and where a property of excitation or response of the first component is different from a corresponding property of the second component and at least part of the identified characteristic is represented by this difference between the properties of the components;

where the second identifier component includes a second dye having the same excitation frequency band as the first dye; and where the first dye has a fluorescence response delay greater than that of the second dye.

21. An article identifier identifying at least a characteristic of an article, the identifier comprising:

a first identifier component including a first fluorescent dye having a first excitation frequency band and a first response frequency band;

a second identifier component having a second excitation frequency band and a second response frequency band;

where at least the first and second response frequency bands or the first and second excitation frequency bands are substantially the same; and where a property of excitation or response of the first component is different from a corresponding property of the second component and at least part of the identified characteristic is represented by this difference between the properties of the components; and where the first and second identifier components include mathematically related information-bearing portions.

22. The article identifier of claim 21, where the first identifier component is an image or alpha-numeric string embedded within the second identifier component.

23. The article identifier of claim 21, where the response frequency band of the first dye is the same as the response frequency band of the second identifier component.

24. The article identifier of claim 21, where the information-bearing portion of the identifier is at least partially alpha-numeric.

25. The article identifier of claim 21, where the second identifier component includes a second dye having the same excitation frequency band as the first dye.

26. The article identifier of claim 21, where the first and second identifiers are part of information printed or embroidered on a garment tag.

27. The article identifier of claim 21, the identifier further comprising a third identifier component including a third fluorescent dye having a third excitation frequency band and a third response frequency band.

28. The article identifier of claim 21, where the information bearing portion is at least partially represented by an ordinary ink.

29. The article identifier of claim 21, where at least one excitation frequency band includes infra-red wavelengths.

30. The article identifier of claim 21, where the second response frequency band includes infra-red wavelengths.

31. The article identifier of claim 21, the identifier further including a third identifier component created by combining or overlapping the first and second components.

32. The article identifier of claim 21, where the identifier is a multi-layered image and where at least one image layer includes the first identifier component and at least one other image layer includes the second identifier component.

33. The article identifier of claim 21, where the second identifier component includes a second fluorescent dye.

34. An article identifier identifying at least a characteristic of an article, the identifier comprising:

a first identifier component having a first excitation frequency band and a first response frequency band;

a second identifier component having a second excitation frequency band and a second response frequency band;

where at least the first and second response frequency bands or the first and second excitation frequency bands are substantially the same; and where a property of excitation or response of the first component is different from a corresponding property of the second component and at least part of the identified characteristic is represented by this difference between the properties of the components; and where the first and second identifier components include mathematically related information-bearing portions.

* * * * *